United States Patent
Johnson et al.

[15] 3,650,296
[45] Mar. 21, 1972

[54] APPARATUS FOR SIMULTANEOUSLY CONTROLLING THE FLOW OF FLUIDS IN A PLURALITY OF FLOW PATHS

[72] Inventors: Carl V. Johnson, Baldwin; Reino Leisio, Bronxville, both of N.Y.

[73] Assignee: Technicon Corporation, Tarrytown, N.Y.

[22] Filed: Sept. 22, 1969

[21] Appl. No.: 864,262

[52] U.S. Cl..............................137/624.18, 137/597, 251/9, 251/75
[51] Int. Cl.......................................................F16k 11/00
[58] Field of Search....................137/124.11, 624.18, 624.2, 137/597, 1; 251/9, 5, 75

[56] References Cited

UNITED STATES PATENTS

| | | | |
|---|---|---|---|
| 3,468,342 | 9/1969 | Craft | 137/597 X |
| 3,134,395 | 5/1964 | Glasgow | 137/597 X |
| 2,594,762 | 4/1952 | Freund | 137/597 X |
| 3,084,714 | 4/1903 | Getz | 251/75 X |
| 3,172,285 | 3/1965 | Dietert | 251/75 X |
| 3,506,032 | 4/1970 | Eveleigh | 137/624.2 |

*Primary Examiner*—Alan Cohan
*Attorney*—S. P. Tedesco

[57] ABSTRACT

New and improved method and apparatus for simultaneously controlling the flow of fluids in a plurality of flow paths are provided and take the form of valve means having a plurality of low volume, separate flow paths therethrough, means to control the flow of fluids through a first plurality of said flow paths, means to control the flow of fluids through a second plurality of said flow paths, and actuation means to actuate said fluid flow controlling means in such manner that said respective pluralities of fluid flow paths are never simultaneously closed, and are simultaneously opened only for the briefest period of time to respectively prevent pressure build-up upstream of the valve means and to insure an extremely low hold-up volume within the valve means resultant near perfect fluid flow cut-off or separation characteristics through the valve means.

2 Claims, 7 Drawing Figures

INVENTORS
CARL V. JOHNSON
REINO LEISIO
BY James J. Romans, Jr.
ATTORNEY

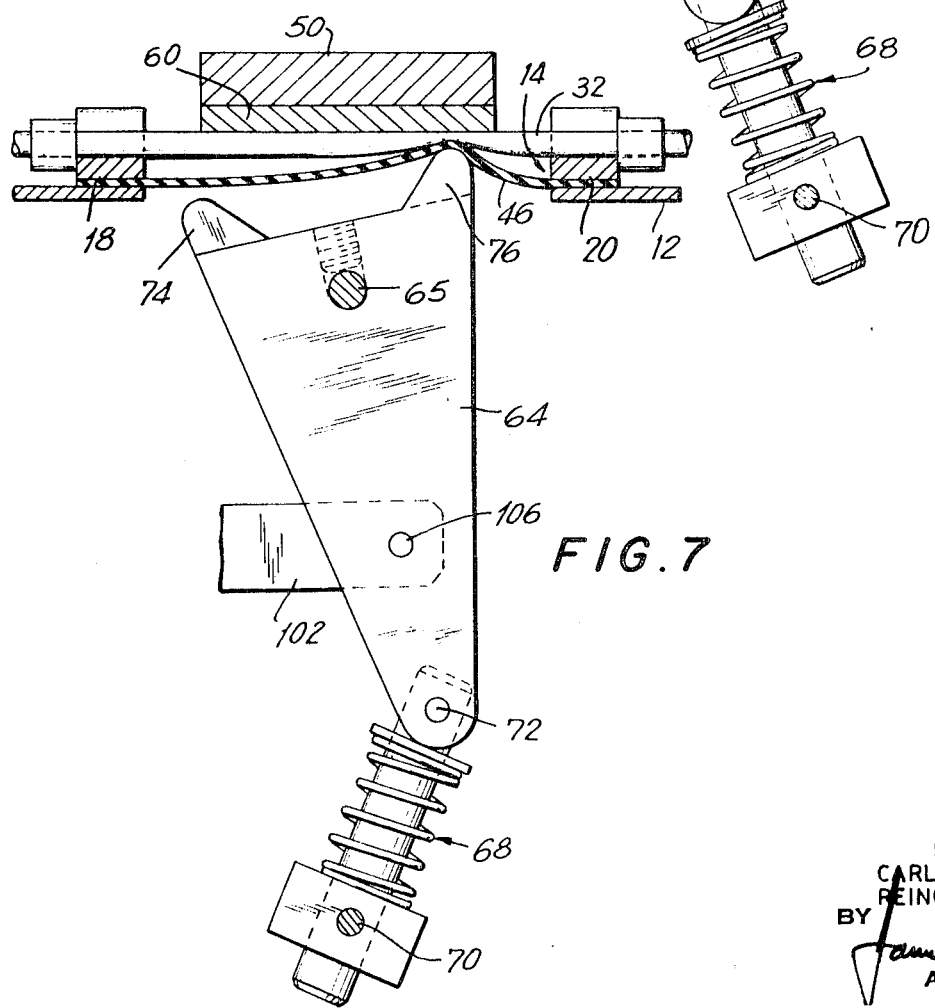

APPARATUS FOR SIMULTANEOUSLY CONTROLLING THE FLOW OF FLUIDS IN A PLURALITY OF FLOW PATHS

BACKGROUND OF THE INVENTION

1. Field of the Invention.

This invention relates to new and improved method and apparatus for simultaneously controlling fluid flow along a plurality of fluid flow paths.

2. Description of the Prior Art.

Although apparatus for the simultaneous control of fluid flow along a plurality of fluid flow paths are known and take the form, for example, of multi-port or multielement valve means, it may be understood that, in general, such valve means will be found to be somewhat limited in fields of use by the relatively high hold-up volume contained therewithin. More specifically, it may be understood that for use, for example, in automatic fluid analysis systems which require precise metering and timing of the flows of successive streams of portions of different fluids along different flow paths, and the clear separation between said different fluid portions within each of said fluid flow paths, and/or upon the merger of said fluid flow paths, said relatively large hold-up volumes will render impossible the requisite clear separation between said different fluid portions by effecting contamination of a succeeding fluid portion with the hold-up volume or residue of a preceding fluid portion.

In addition, it may be understood that, in many instances, such multi-port or multielement valve means are quite complex and costly, require large pluralities of finely machined port and valve member components, are relatively noisy in operation, and/or require relatively extensive repair or replacement upon operational malfunction. Too, in many instances, such valve means do not provide for the rapidity in valve switching which is a requisite for use in automatic fluid analysis systems of the type discussed hereinabove.

OBJECTS OF THE INVENTION

It is, accordingly, an object of this invention to provide new and improved method and apparatus for accurately simultaneously controlling fluid flow along a plurality of fluid flow paths which embody an extremely low fluid hold-up volume and a rapid switching time to thus insure near perfect fluid cutoff or separation upon apparatus switching.

Another object of this invention is the provision of apparatus as above which are of substantially reduced complexity and cost when compared with the functionally similar apparatus of the prior art.

Another object of this invention is the provision of apparatus as above which require substantially less space then the like apparatus of the prior art.

Another object of this invention is the provision of apparatus as above which are substantially quieter in operation than the like apparatus of the prior art.

A further object of this invention is the provision of apparatus as above which require the use of only readily available components of proven dependability in the fabrication thereof to thus insure long periods of satisfactory, maintenance free apparatus operation.

A still further object of this invention is the provision of method and apparatus as above which are particularly, though by no means exclusively, adapted for use in automatic fluid analysis systems which require precise metering and timing of the flow of different fluids portions and clear separation therebetween upon the merger thereof within the same fluid flow path.

SUMMARY OF THE INVENTION

As disclosed herein, the method and apparatus of the invention are embodied by valve means which comprise a plurality of low volume compressible tubes of relatively short extent for the flow of different fluids therethrough. Valve actuator means are included and comprise a valve actuator which is moveable between first and second mechanically stable positions thereof and is operable, in said first position, to prevent fluid flow through a first pair of said compressible tubes and, in said second position thereof, to prevent fluid flow through a second pair of said compressible tubes. To this effect, said valve actuator means take the form of a valve actuator which is arranged in generally overcenter manner and is biased to either of said first or second mechanically stable positions thereof by constant force biasing means, and valve actuator operation means which are mechanically connected to said valve actuator and are operable to cycle the latter in rapid, snap-action manner between said first and second positions thereof to thereby enable the precise control of the flow of said different fluids through said different pairs of compressible tubes. For use, for example, in an automatic fluid analysis system directed toward the typing of blood samples, the apparatus of the invention is arranged to receive concomitant streams of blood sample cells and a suitable wash liquid, respectively, through different tubes of each of said tube pairs, and to supply a stream of precisely separated, successive quotients of said blood sample cells, and slugs of said wash liquid, respectively, to a blood cell typing circuit. The construction of the apparatus is such that there is always an open flow path therethrough whereby undesirable fluid pressure buildup upstream of the said apparatus is prevented.

BRIEF DESCRIPTION OF THE DRAWINGS

The above and other significant objects and advantages of this invention are believed made clear by the following detailed description thereof taken in conjunction with the accompanying drawings wherein:

FIG. 6 is a cross-sectional view taken generally along the line 6—6 in FIG. 1; and FIG. 7 is a cross-sectional view taken generally along line 7—7 in FIG. 1.

DETAILED DESCRIPTION OF THE INVENTION

Referring now to FIGS. 1 through 4 of the drawings, the new and improved apparatus of the invention may be seen to take the form of a bar valve as generally indicated at 10 which comprises a base plate 12 having an aperture as generally indicated at 14 formed therein.

Figure 5:
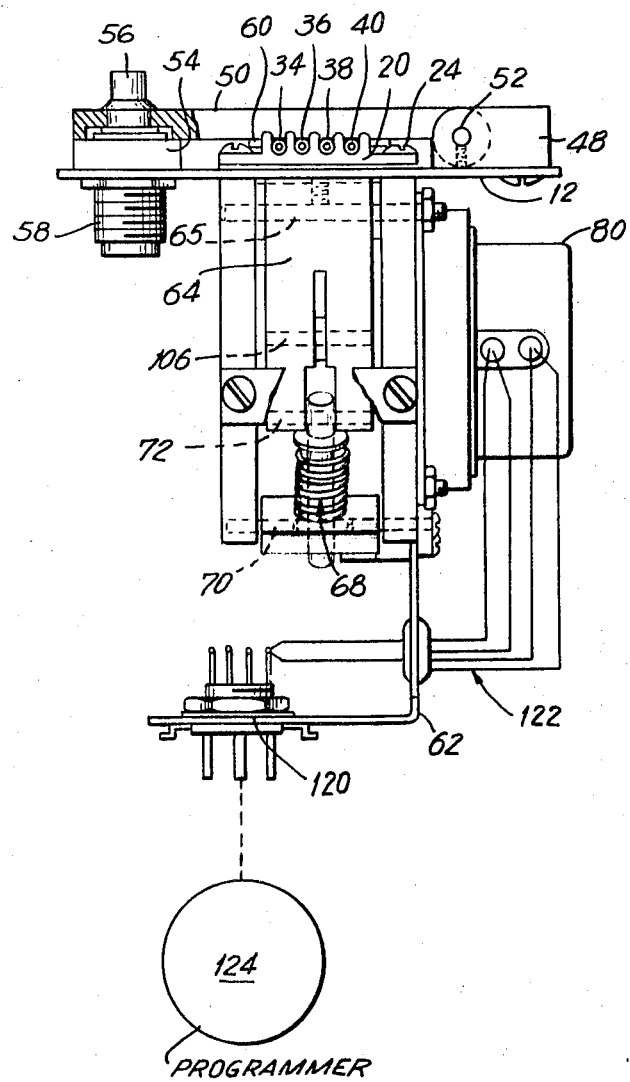
FIG. 5 is an opposite end elevational view of the apparatus of FIG. 1.

A fluid conduit or compressible tube assembly is generally indicated at 16 and may be seen to be mounted atop the base plate aperture 14. More specifically, it may be understood that the said fluid conduit or compressible tube assembly 16 may, for example, take the general form of that shown and described as a pump tube mounting assembly in U.S. Pat. No. 3,227,091 issued Jan. 4, 1966 to Jack Isreeli et al. and, as such, comprises generally "L"-shaped tube mounting blocks 18 and 20 which are mounted as shown in diametrically opposed manner stop the base plate 12 by means of attachment screws 22 and 24 extending respectively therethrough to substantially surround the said base plate aperture 14. Compressible tubes which may be made from any suitably resilient material of appropriate strength characteristics in the nature, for example, of polyvinyl chloride, are indicated at 26, 28, 30 and 32, respectively, and extend as shown over the base plate aperture 14 between the said tube mounting blocks. The said compressible tubes are respectively affixed to the said tube mounting blocks by means of the placement of the former in complementally shaped, aligned mounting grooves which are formed in the latter as illustrated at 34, 36, 38 and 40, respectively, in FIG. 5 for the tube mounting block 20, and the attachment of adjustably positionable collar elements as indicated at 42 and 44 for tube 26 to opposite outboard portions of said compressible tubes to bear against the respective outboard side surfaces of the tube mounting blocks 18 and 20 and maintain the said tubes firmly positioned within said aligned tube mounting grooves, all in a manner made clear in said U.S. Pat. No. 3,227,091. A thin shield of any suitable plastic material in the nature, for example, of polyurethane, is indicated at 46 and is disposed as shown between the respective tube mounting blocks 18 and 20 and the upper surface of the base plate 12 to substantially cover or close the base plate aperture 14 for purposes described in greater detail hereinbelow.

Figure 1:
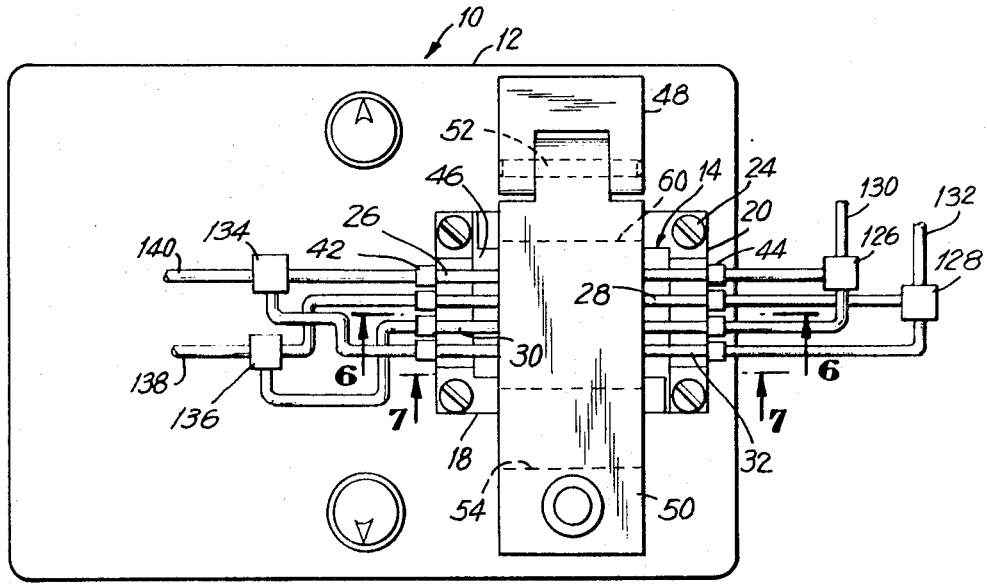
FIG. 1 is a top plan view of new and improved apparatus constructed in accordance with the teachings of this invention in the operative or "closed" position thereof and operatively connected in a fluid analysis system.
Figure 2:
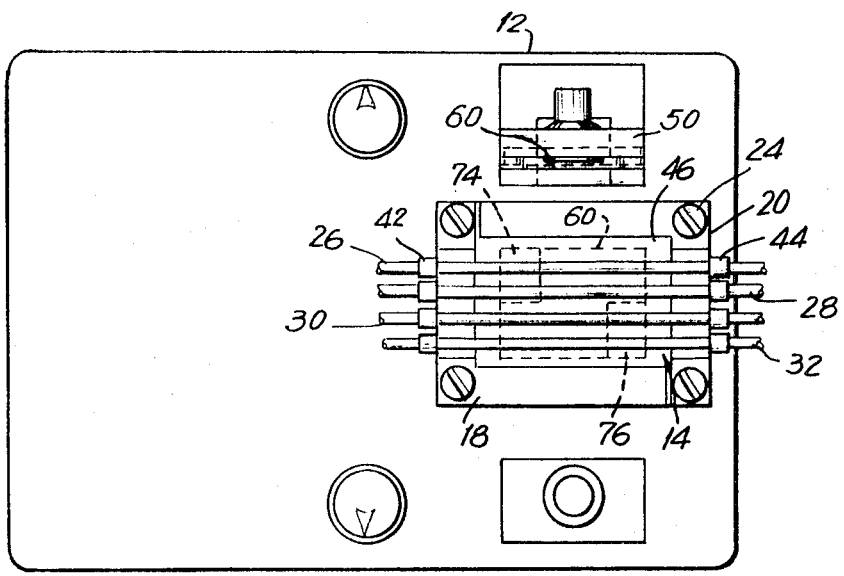
FIG. 2 is a top plan view of the apparatus of FIG. 1 in the "open" position thereof to more clearly depict the actuator means thereof.

A hinge member 48 is mounted as shown on the base plate 12 to one side of the pump mounting blocks, and a pressure plate 50 is pivotally mounted therefrom by means of a pivot pin 52 extending therebetween in such manner that the pressure plate 50 is readily moveable between the "open" position thereof depicted in FIG. 2 and the "closed" position thereof depicted in FIG. 1. A spacer block 54 is disposed on the base plate 12 to the other side of the tube mounting blocks, and push button fastener means which include a stud 56 which extends as shown (FIG. 5) through the outer end portion of the pressure plate 50, and a push button fastener receptacle 58 which is disposed as shown (FIG. 5) below the base plate 12, are provided to enable the convenient fastening of the pressure plate 50 in the said "closed" position thereof as should be obvious.

A pressure pad or platen 60 is carried as shown from the undersurface of the pressure plate 50 and is so dimensioned as to be effective to bear against the respective upper surfaces of the compressible tubes 26, 28, 30 and 32 when the said pressure plate is in the "closed" position thereof.

A bearing plate 62 is mounted as shown from the undersurface of the base plate 12 to extend downwardly therefrom. Biasing means which may, for example, take the form of the depicted, constant force spring assembly, are indicated generally at 68 and are pivotally mounted from the lower end portion of the bearing plate 62 by a pivot pin 70 extending therebetween. A generally triangular shaped valve actuator 64 is pivotally mounted at the upper central portion thereof to the bearing plate 62 by the pivot pin 65 (FIG. 5) extending therebetween. In addition, the valve actuator 64 is pivotally connected as shown to the biasing means 68 by means of a pivot pin 72 extending therebetween.

Figure 3:
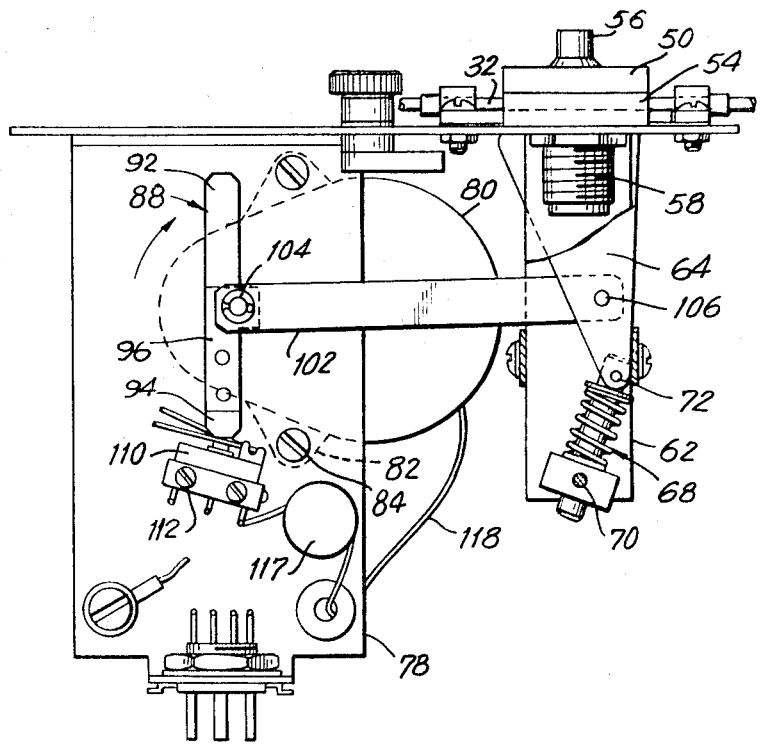
FIG. 3 is a side elevational view of the apparatus of FIG. 1.

Included in the valve actuator 64 are generally rounded projecting portions or bars 74 and 76 which are formed to extend in the spaced, diagonally opposed manner made clear in FIGS. 2 and 6, from the generally flat upper surface of said valve actuator. More specifically, it may be seen in FIG. 2 that the transverse extent of the valve actuator bar 74 is somewhat greater than the combined transverse extent of the pair of compressible tubes 26 and 28, and that the said bar is disposed in general alignment therewith. In like manner, and again referring to FIG. 2, it may be seen that the transverse extent of the valve actuator bar 76 is somewhat greater than the combined transverse extent of the pair of compressible tubes 30 and 32, and that the said bar is disposed in general alignment with the said tubes. Although explained in greater detail hereinbelow, it may at this juncture be briefly noted that the valve actuator bar 74 is effective to contact and compress the respective compressible tubes 26 and 28 against the undersurface of the pressure pad or platen 60 to prevent fluid flow therethrough as depicted in FIG. 6 with the valve actuator 64 in a second position thereof, and that the valve actuator bar 76 is likewise effective to contact and compress the respective compressible tubes 30 and 32 against the said platen undersurface to prevent fluid flow therethrough when the valve actuator 64 is in a first position thereof as depicted in FIGS. 3 and 7.

A second bearing plate is indicated at 78 and is carried as shown from the underside of valve base plate 12 to extend downwardly therefrom. A valve drive motor which may, for example, take any suitable form in the nature of a 20 r.p.m. electric motor, is indicated at 80 and is supported as shown from the bearing plate 78 in conventional manner through the use of mounting flanges 82 and attachment screws 84.

Figure 4:
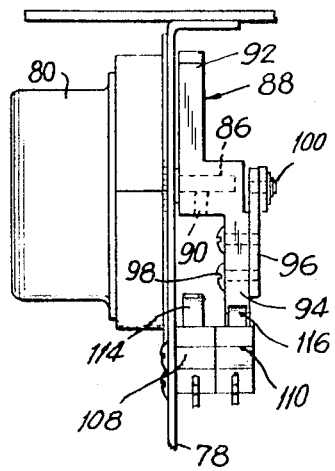
FIG. 4 is an end elevational view of the apparatus of FIG. 1.

The drive shaft 86 of the motor 80 extends as best seen in FIG. 4 through the bearing plate 78, and switch actuator means as generally indicated at 88 are affixed thereto so as to be rotatable therewith by means of set screw assembly as indicated at 90. The switch actuator means 88 comprises a first switch actuator arm 92 and a second switch actuator arm 94 displaced from the former by approximately 180 degrees and disposed, as made clear in FIG. 4, in a different plane. A mounting plate assembly is indicated at 96 and is secured as shown to the switch actuator arm 94 by means of attachment screws 98 extending therebetween. A stud 100 extends as shown from the extremity of plate assembly 96, and one extremity of a link 102 is pivotally attached to the said plate assembly by the passage of the said stud therethrough and the attachment of a retaining ring 104 thereover as made clear in FIG. 3. The other extremity of the link 102 is pivotally attached to the valve actuator 64 somewhat below the center of the latter by the extension of a pivot pin 106 therebetween.

Limit switches 108 and 110 are mounted as shown in the depicted side-by-side manner from the bearing plate 78 by the passage of attachment screws 112 (FIG. 3) therebetween. The limit switch 108 includes a switch actuator 114 which extends therefrom as shown into the path or plane of rotation of the switch actuator arm 92, while the limit switch 110 includes a switch actuator 116 which extends therefrom as shown into the path or plane of rotation of the switch actuator arm 94.

Each of the limit switches 108 and 110 is electrically connected, through a capacitor 117, to the motor 80 as illustrated by the conductor 118 extending therebetween in FIG. 3. A plug connector is indicated at 120 and is supported as shown from the lower extremity of the bearing plate 78 in the manner best seen in FIG. 5. A plurality of conductors as indicated generally at 122 are provided to connect the plug connector 120 to the motor 80, again in the manner best seen in FIG. 5. Programmer means are indicated schematically at 124 in FIG. 5 and are also connected, as indicated by the dashed line, through the plug connector 120 and the conductors 122 to the motor 80.

As utilized herein, it may be understood that each of the limit switches 108 and 110 is electrically connected to the motor 80 to function as a stop switch in that the depression of the relevant switch actuator by the relevant switch actuator arm of the switch actuator means 88 will be effective to discontinue operation of the motor 80. In addition, it may be understood that the programmer means 124 are connected to the motor 80 in such manner as to be effective to electrically override the respective limit switches 108 and 110 to the extent of one-half revolution of drive motor shaft 86. More specifically, with the switch actuator means 88 positioned as illustrated in FIGS. 3 and 4 to result in the depression of switch actuator 116, the switch 110 will be effective to prevent the supply of power to the motor 80 to thus maintain the latter stopped. However, upon command from the programmer 124, it may be understood that the switch 110 will be electrically overriden and the motor 80 energized to rotate shaft 86 until such time as the switch actuator arm 92 of the switch actuator means 88 has been rotated through approximately 180° to depress switch actuator 114 of limit switch 108 to discontinue the supply of power to the motor 80 and re-stop the same. In like manner, it may be understood that with limit switch 108 actuated and the motor 80 stopped accordingly, subsequent command from the programmer means 124 will be effective to re-start the motor 80 to rotate the switch actuator means 88 through another 180° to return the switch actuator means 88 to the position thereof of FIGS. 3 and 4 with resultant re-actuation of switch 110 and attendant re-stopping of the motor 80. Accordingly, it is believed made clear that the switch actuator means 88 will be repeatedly cycled through approximately 180° rotational increments in response to repeated commands to that effect from the programmer means 124.

Referring again to the valve actuator 64, it may be understood that the pivotal mounting thereof on the bearing plate 62, the pivotal connection of the lower portion thereof to the biasing means 68, the biasing effect of the latter, and the pivotal connection of the said valve actuator means to the link 102 will combine to provide a snap action or over center arrangement, in the nature of that embodied in a toggle switch, with only two mechanically stable positions. More specifically, and referring now to FIGS. 2, 3, 6 and 7, it may be understood that with the switch actuator means 88 and the link 102 positioned as depicted in FIGS. 3 and 7, the valve actuator 64 will be pushed by the link 102 and concomitantly biased by the biasing means 68 to the depicted, first mechanically stable position thereof wherein the bar 76 is effective to occlude the pair of compressible tubes 30 and 32 by the compression thereof against the undersurface of the pressure pad or platen 60 to thus prevent fluid flow therethrough, while the bar 74 will be disposed somewhat below and out of contact with the pair of compressible tubes 26 and 28 to have no effect upon the flow of fluids therethrough. Conversely, with the switch actuator 88 moved approximately 180° to move the link 102 to the position thereof depicted in FIG. 6, it may be understood that the valve actuator 64 will be pulled by the link 102 and concomitantly biased by the biasing means 68 to the depicted second mechanically stable position thereof wherein the bar 74 will be effective to occlude the pair of compressible tubes 26 and 28 by the compression thereof against the undersurface of the pressure pad or platen 60 to thereby prevent fluid flow therethrough, while the bar 76 will be disposed somewhat below and out of contact with the pair of compressible tubes 30 and 32 to leave the same open with no effect on the flow of fluids therethrough. Accordingly, it is believed made clear that repeated cycling, as described, of the valve actuator 64 between said first and second mechanically stable positions thereof, under the substantially constant biasing force of the biasing means 68, will be effective to alternately open and close the respective pairs of compressible tubes 26 and 28, and 30 and 32, to thereby enable the cyclic control of the flow of fluids therethrough.

With regard to the operation of motor 80 in cycling the valve actuator 64 between said first and second mechanically stable positions thereof, it may be understood that switch actuator means 88, link 102 and valve actuator 64 are arranged to enable the motor 80 to rotate through approximately 60 degrees before meeting resistance from the link 102 to thus provide for more rapid action of the valve actuator 64.

For use, for example, for fluid flow directing purposes in an automated fluid analysis system in the nature of the New And Improved Method and Apparatus For the Automatic, Sequential Typing of Blood Samples as shown and described in the copending application for United States Patent of John C. A. Peoples, et al. Ser. Number 864,263, filed Sept. 22, 1969 and assigned to the assignee hereof, it may be understood that inlet ends of compressible tubes 26 and 30 would be connected as shown to the outlets of a fitting 126, while the respective inlet ends of compressible tubes 28 and 32 would be connected as shown to the outlets of a fitting 128. In addition, a tube 130 would be connected to the inlet of fitting 126 to supply a successive stream of blood cells from different blood samples thereto, while a tube 132 would be connected as shown to the inlet of fitting 128 to supply a suitable wash liquid thereto. In addition, the respective outlet ends of compressible tubes 26 and 32 would be connected as shown to the respective inlets of a fitting 134, while the respective outlet ends of conduits 28 and 30 would be connected as shown to the respective inlets of a fitting 136. Also, a tube 140 would connect the outlet of fitting 134 to the cell typing circuit of the blood typing apparatus, while a tube 138 would connect the outlet of fitting 136 to waste.

In operation, it may be understood that the apparatus of the invention would be repeatedly cycled under the control of the programmer means 114 to cycle the valve actuator 64 between said first and second mechanically stable positions thereof to in turn alternately open the pair of compressible tubes 26 and 28 to fluid flow while closing the pair of compressible tubes 30 and 32 thereto, and vice versa. As a result, and with the valve actuator 64 in said first mechanically stable position thereof as depicted in FIG. 7, it may be understood that blood sample cells would be flowed to the said cell typing circuit through compressible tube 26, fitting 134 and tube 140, respectively, while the wash liquid would be flowed to waste through compressible tube 28, fitting 136 and tube 138, respectively. Upon cycling of the apparatus of the invention to move the valve actuator 64 to said second mechanically stable position thereof as depicted in FIG. 6, it may be understood that the blood sample cells would be flowed to waste through compressible tube 30, fitting 136 and tube 138, respectively, while the wash liquid would be flowed to the said blood cell typing circuit through compressible tube 32, fitting 134 and tube 140, respectively. Accordingly, it is believed made clear that the operation of the apparatus of the invention will function, when used as described, to provide a successive stream of blood sample cell quotients spaced, each from the other, by a slug of wash liquid, to the said cell typing circuit, with almost perfect separation between said cell quotients and wash liquid slugs, and the respective extents thereof in conduit 140 being susceptible of precise determination through proper programming of the programmer means 124 as should be obvious.

Of particular advantage with regard to the apparatus of the invention is the fact that the hold-up or retained volume within the same at any given time is extremely small whereby very precise separation between the different fluids alternately supplied therefrom to the tube 140 is insured. More specifically, it may be understood that for use, for example, with compressible tubes having inner diameters in the nature of 0.010 inches, the amount of a fluid sample trapped in the apparatus in a compressible tube upstream of a closed bar at any one time is so small as to be practically immeasurable, whereby contamination of a succeeding fluid sample by the thusly trapped portion of a preceding fluid sample upon reopening of the bar is absolutely minimized. Too, it may be understood that the extremely rapid action of the valve actuator 64 in snap action movement between said first and second mechanically stable positions thereof insures absolute minimization of the time that simultaneous fluid flow through all four compressible tubes of the apparatus may occur to further improve the fluid separation effectiveness of the same. In addition, the face that all four of the compressible tubes are never closed at the same time renders impossible undesirable pressure buildup upstream of the apparatus, which pressure buildup if allowed to occur, could adversely effect the highly accurate and precisely timed fluid metering which is essential to suitable operation of automatic fluid analysis systems of the nature discussed. Further, the use of a relatively low r.p.m. motor, rather than the more conventional solenoid, to drive the new and improved bar valve of the invention may readily be understood to render the same substantially quieter in operation, while the significant advantages of compactness and reduced complexity provided by the apparatus of the invention are believed self-apparent.

In the event of rupture of one of the compressible tubes 26, 28, 30 and 32, it may be understood that the replacement thereof may be effected in a most convenient, rapid and inexpensive manner by the simple "opening" of the pressure plate 50 to the position thereof of FIG. 2, and the replacement of the relevant compressible tube through unfastening and refastening of the relevant tube collar elements as described at 42 and 44 (FIG. 1) for compressible tube 26. Too, it may be understood that the inperposition of the plastic shield member 46 between the valve actuator 64 and the said compressible pump tubes will substantially prevent the leakage of any fluid into the actuator operating means portion of the apparatus upon tube rupture, as should be obvious.

It is believed clear that for applications other and different than the blood sample typing system application discussed hereinabove by way of example, only, that the apparatus of the invention could be configured in manners other and different than that shown and described herein. More specifically, it may be understood, for example, that a lesser or greater number of compressible tubes could be provided and that a greater number of actuator bars could be provided as required by the essential fluid flow parameters of the fluid flow system to which the apparatus of the invention is to be applied.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appendec claims.

What is claimed is:

1. In apparatus for simultaneously controlling the flow of fluids in a plurality of fluid flow paths, the improvements comprising, a first compressible tube forming a first fluid flow path, a second compressible tube forming a second fluid flow path, means to prevent fluid flow in said first compressible tube by the substantial compression thereof while enabling fluid flow in said second compressible tube, and for preventing fluid flow in said second compressible tube by the substantial compression thereof while enabling fluid flow in said first compressible tube whereby the flow of fluids in said first and second compressible tubes may be simultaneously controlled, said means to substantially compress said first and second compressible tubes comprising actuator means which includes in actuator which is moveable only between a first mechanically stable position thereof in which said first compressible tube is substantially compressed and a second mechanically stable position thereof in which said second compressible tube is substantially compressed, said actuator being pivotally mounted in generally over center fashion to be pivotally moveable between said first and second positions thereof, said actuator means also comprising biasing means which is effective to bias said actuator to each of said positions, said actuator means comprising rotating motor means which is mechanically connected to said actuator and effective to alternately move the latter between said first and second, and second and first positions thereof, respectively for every approximately 180° of rotation of said motor means, and said actuator means further comprising first and second switch means which are respectively effective to be alternately actuated by said rotating motor means for approximately 180° of rotation of the latter to stop the motor means.

2. In apparatus for simultaneously controlling the flow of fluids in a plurality of flow paths, the improvements comprising, a first compressible tube forming a first fluid flow path, a second compressible tube forming a second fluid flow path, pinch valve means to prevent fluid flow in either said first compressible tube or said second compressible tube by the substantial compression thereof while enabling fluid flow in the other compressible tube, first fluid flow means connected to said first and second flow paths upstream of the valve means for providing an alternative flow path to each compressible tube for pressure relief when that tube is closed by said valve means, and second fluid flow means connected to said first and second flow paths downstream of said valve means for receiving fluids alternately from said first and second flow paths, said first fluid flow means comprising a third compressible tube forming a third fluid flow path connected to said first compressible tube upstream of said valve means and operable to be substantially compressed with said second compressible tube by said valve means, and a fourth compressible tube forming a fourth fluid flow path connected to said second compressible tube upstream of said valve means and operable to be substantially compressed with said first compressible tube by said valve means, whereby the flow of fluids in said first and fourth compressible tubes and said second and third compressible tubes may be simultaneously controlled, said valve means being operatively connected to motor means for reciprocating the valve means between its operative positions, said pinch valve means being moveable between its operative positions by a bistable, spring-biased, toggle action device, a rotary drive member operatively coupled to said valve means to reciprocate said valve means upon rotation of the rotary drive member, and first and second switch means actuatable alternately by the rotary drive member to stop said motor means when the valve means is moved from one position thereof to the other.

* * * * *